Patented Feb. 22, 1938

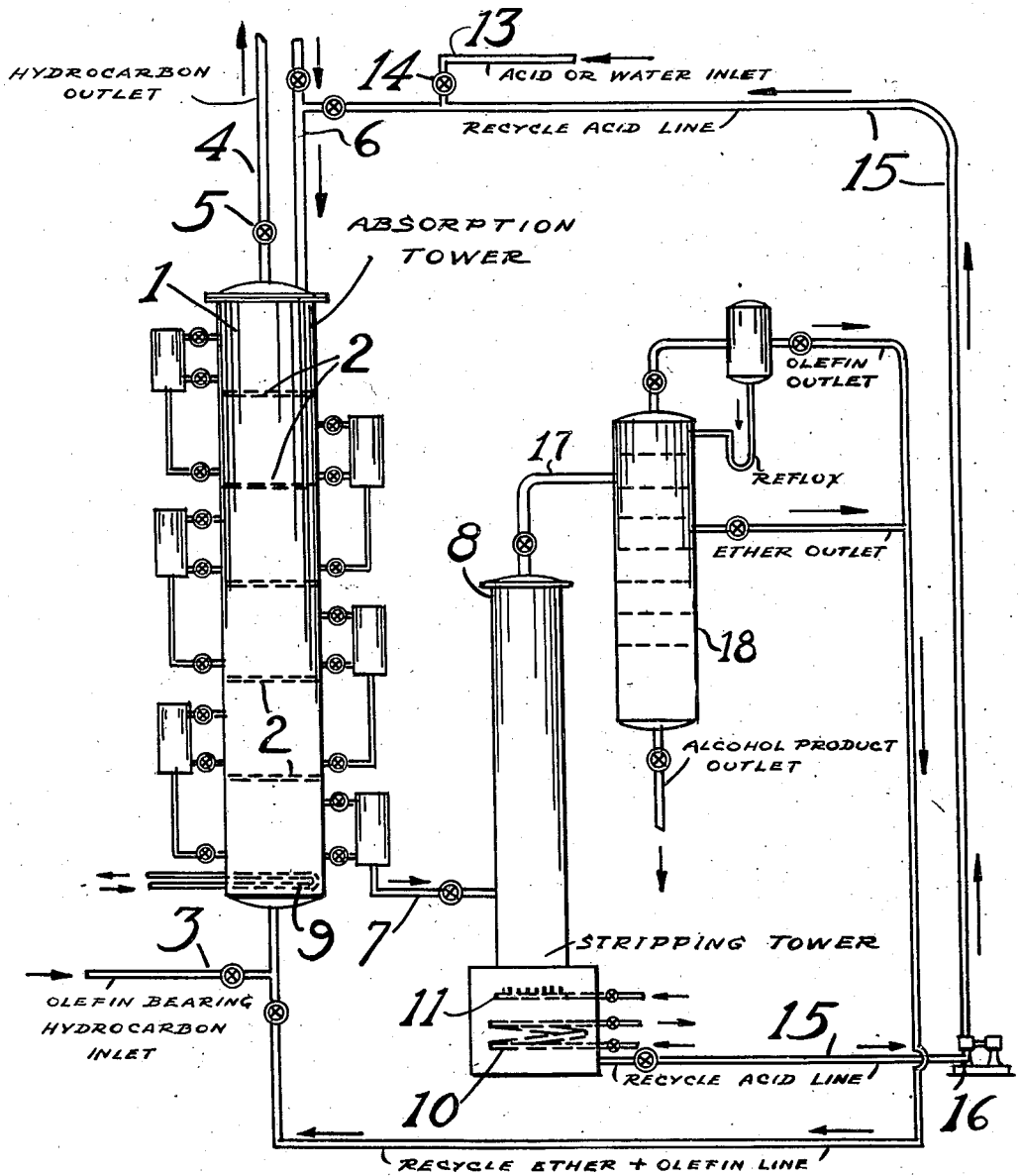

2,109,004

UNITED STATES PATENT OFFICE 2,109,004

SECONDARY ALCOHOL PRODUCTION

Francis M. Archibald, Elizabeth, and Helmuth G. Schneider, Roselle, N. J., assignors to Standard Alcohol Company Application August 12, 1936, Serial No. 95,578

7 Claims. (Cl. 260—156)

This invention relates to an improved process for producing an alcohol directly from an olefin and relates more particularly to a catalytic process for producing an alcohol from an olefin containing two to five carbon atoms. It may likewise be used to produce alcohol from an olefin containing up to seven carbon atoms or more.

It is known that olefins may be reacted with catalytic materials to form reactive acid liquors, the reactive acid liquors diluted, hydrolyzed and distilled to obtain alcohols. The catalytic material generally used is sulfuric acid, though other catalytic materials have been used, for example, phosphoric acid, hydrochloric acid, acetic acid and other acids, and also aqueous solution of salts such as zinc chloride, aluminum chloride, etc., of the concentrations at which they are capable of forming reactive acid liquors.

It has been found that olefins on reacting with catalytic materials of definite concentration and temperatures form alkyl sulfates, alcohols and ethers directly. It has been shown in copending application, Serial No. 83,894, "Production of ethers directly from olefins", filed June 6, 1936, by H. G. Schneider, that after certain amounts of alkyl sulfates, alcohols and ethers are formed, the reaction reaches an equilibrium. If the ethers thereby produced are removed and the amount of ethers in the acid solutions maintained at low concentration, the equilibrium is disturbed. Substantially all of the olefins thereafter passed into the olefin acid liquor are converted into ethers if the ethers are removed continuously as they are formed.

According to this invention, it has been found that alcohol is formed directly when an olefin is contacted with an aqueous hydrating catalyst of definite concentration, and at certain temperatures and pressures, and after the alcohol is separated from the catalytic material the catalytic material reacts with more of the olefin added to form more alcohols. Ether is also formed which may be separated from the catalytic material together with the alcohol. The preferred method of separating the alcohol or a mixture of alcohol and ether from the catalytic material is by steam stripping though they may be distilled off without the addition of steam. Solvent extraction may also be used.

The invention will be more fully understood on reading the following description with reference to the accompanying drawing.

The drawing shows a diagrammatic view in sectional elevation of an apparatus adapted to carry out the process of the invention and indicates the flow of materials.

Referring to the drawing, numeral 1 represents an absorption tower. This tower is provided with acid plates 2 or other means whereby good contact of the catalytic material and the olefinic material is obtained. The catalytic material preferably used according to this invention is an aqueous solution of sulfuric acid of 50 to 70% concentration when propylene is the olefin being reacted. Higher concentrations of aqueous sulfuric acid up to 84% and lower concentrations to 1% may be used with propylene and the other olefins. While aqueous sulfuric acid is the preferred catalyst, other aqueous solutions of catalytic material may be used, for example, aqueous solutions of phosphoric acid, hydrochloric acid, zinc chloride, aluminum chloride, etc. It is not necessary to use the diluted sulfuric acid as such in the absorption tower as reactive acid liquor diluted to below 84%, preferably about 50% to 70%, may be used. The aqueous catalytic material is maintained at substantially the same concentration throughout the process.

The olefin, or mixture of olefins, if mixture of different alcohols is to be made, substantially pure or in a hydrocarbon mixture containing the desired olefin or olefins, is passed into the bottom of absorption tower 1 by means of pipe 3. This olefin is passed into the bottom of the absorption tower 1 under a partial pressure of the olefin of at least 2 pounds per square inch. Pressures of 40 to 200 or more pounds per square inch partial pressure of the olefin are preferred though higher and lower pressures may be used. It is not necessary that the olefin be in vapor phase as olefin in the liquid phase may also be used to produce alcohol according to this invention.

The olefin passes upwardly through the absorption tower 1 through the aqueous sulfuric acid layers on the acid plates 2. Oil layers may be maintained on the top of the aqueous catalytic acid layers if desired in order to obtain better contact of the acid and the olefin. An outlet pipe 4 provided with valve 5 removes the unreacted materials. The aqueous catalytic material is passed into the absorption tower 1 through pipe 6 and while flowing downward through the absorption tower is contacted with the olefin material. The aqueous catalytic material with the reaction products in solution is passed through pipe 7 into the stripping tower 8. The absorption tower is maintained at a temperature of 30° C. or higher by means of coil 9 or other heat controlling means. The preferred temperature when isopropyl alcohol is being produced is about 60° to 130° C. By the use of these temperatures, pressures, and catalytic concentration all of the olefins present are reacted in one pass.

Stripping tower 8 is provided with a steam coil 10 and also an open steam spray outlet 11, whereby the temperature may be raised to the distilling temperature of the alcohol and ether and the concentration of the acid controlled. The vapors of alcohol and ether are removed through outlet 17 and fractionated in tower 18 if desired, condensed and passed to storage.

The separated ether is preferably recycled back into the olefin material that is passed into the absorption tower 1, by means of pipe 3 though both alcohol and ether may be passed to storage. The separated sulfuric acid in stripping tower 8 is withdrawn through line 15 and passed by means of pump 16 into pipe 6 and thereby into the absorption tower 1. When the open steam spray outlet is not used to remove the alcohol and ether and at the same time to maintain the acid at the desired concentration, water is added to the acid as it enters pipe 6 before it is returned to the absorption tower 1 through pipe 13 provided with valve 14. The acid is used continuously, being recycled to the absorption tower after the alcohol and ether are stripped out, though it may be necessary to add small amounts of the acid and water through pipe 13 provided with valve 14 to maintain the desired volume due to slight losses, and also to maintain the desired concentration.

The following table shows the yields of isopropyl alcohol and isopropyl ether obtained on reacting propylene and aqueous sulfuric acid of different concentrations and at different temperatures and pressure over various lengths of time:

| Concentration of sulfuric acid used | Layer of oil maintained over acid | Temperature | Partial pressure of propylene, lbs. per sq. inch | Time of contact hours | Products per mol. of sulfuric acid | |
|---|---|---|---|---|---|---|
| | | | | | Mol. of alcohol | Mol. of ether |
| Percent | | °C. | | | | |
| 55 | Oil present | 110 | 190 | 1 | 1.37 | 0.193 |
| 55 | Oil present | 110 | 190 | 2 | 1.51 | 0.311 |
| 55 | Oil present | 110 | 190 | 4½ | 1.79 | 0.56 |
| 60 | Oil present | 100 | 190 | 1 | 1.54 | 0.191 |
| 60 | Oil present | 100 | 190 | 2 | 1.73 | 0.343 |
| 60 | Oil present | 100 | 190 | 4½ | 1.96 | 0.570 |
| 60 | No oil present | 100 | 190 | 1 | 1.15 | 0.150 |
| 60 | No oil present | 100 | 190 | 4½ | 1.94 | 0.72 |
| 60 | Oil present | 90 | 170 | 1 | 1.42 | 0.088 |
| 60 | Oil present | 90 | 170 | 2 | 1.715 | 0.204 |
| 60 | Oil present | 90 | 170 | 4½ | 1.985 | 0.324 |
| 60 | Oil present | 100 | 90 | 1 | 1.110 | 0.115 |
| 60 | Oil present | 100 | 90 | 2 | 1.330 | 0.216 |
| 60 | Oil present | 100 | 90 | 4½ | 1.390 | 0.286 |
| 70 | Oil present | 100 | 190 | 1 | 1.570 | 0.463 |
| 70 | Oil present | 100 | 190 | 2 | 1.600 | 0.575 |

Alternately a second absorption tower may be provided into which the ether and olefins separated from the alcohol are passed. Fresh acid may be used in this absorption tower. The saturated acid from the first absorption tower may be used that is by being passed in countercurrent relation to the ether and olefin to obtain supersaturated solution.

The foregoing description is merely illustrative and various changes and alternative arrangements may be made. It is not the intention to limit the process to the exact temperatures, pressures and acid concentrations that are given but to limit it within the scope of the appended claims, in which it is my intention to claim all inherent novelty as broadly as the prior art permits.

We claim:

1. A process for manufacturing an alcohol from an olefin which comprises contacting an olefin with an aqueous solution of sulfuric acid of 1% to 84% concentration and under a partial initial pressure of the olefin above 2 lbs. per square inch, and a hydration temperature above 30° C., separating the aqueous solution of sulfuric acid, stripping the aqueous solution by means of steam of the alcohol and ether that are in solution and at the same time avoiding any dilution or concentration of the sulfuric acid so that it is of constant concentration and recontacting the residual aqueous solution of sulfuric acid of 1 to 84% concentration with another portion of the olefin to further manufacture more of the alcohol.

2. A process for manufacturing isopropyl alcohol from propylene according to claim 1, in which the ether is recirculated with the aqueous solution of sulfuric acid.

3. A process for manufacturing isopropyl alcohol from propylene which comprises continuously passing propylene countercurrently to an aqueous solution of sulfuric acid of about 50 to 70% concentration whereby a substantial amount of isopropyl alcohol is formed directly and is in solution in the aqueous solution of sulfuric acid, continuously withdrawing the aqueous sulfuric acid with the isopropyl alcohol in solution, continuously separating the isopropyl alcohol from the aqueous sulfuric acid while maintaining the aqueous sulfuric acid at the same concentration of about 50 to 70% and continuously recycling the aqueous sulfuric acid countercurrently with more of the propylene.

4. A process for manufacturing isopropyl alcohol from propylene according to claim 3 in which pressure of 40 to 200 pounds per square inch and temperature of 60° to 130° C. are maintained.

5. A process for manufacturing an alcohol from an olefin comprising contacting an olefin with an acid liquor that had been prepared by contacting an olefin with concentrated sulfuric acid and diluted to a concentration less than 70%, whereby an alkyl ester, alcohol and ether are formed directly, separating the alcohol from the aqueous solution of the hydrating catalyst while substantially maintaining the concentration of the hydrating catalyst constant and contacting more of the olefin with the aqueous solution of the hydrating catalyst.

6. A process for manufacturing an alcohol from an olefin which comprises passing a mixture of hydrocarbons containing olefins in countercurrent relation to an aqueous solution of sulfuric acid of less than 70% concentration whereby substantially complete removal of the olefin from the hydrocarbon mixture is obtained and an alkyl ester, alcohol and ether are formed directly, separating the alcohol, ether and an olefin from the aqueous solution of sulfuric acid while maintaining the concentration of the sulfuric acid substantially constant and contacting more of the hydrocarbon mixture containing olefin together with the said ether and olefin that had been separated with the aqueous solution of sulfuric acid to form alcohols.

7. A process for manufacturing an alcohol from an olefin which comprises contacting an olefin together with oil with an aqueous solution of sulfuric acid of 1% to 84% concentration and under a partial initial pressure of the olefin above 2 lbs. per square inch, and a hydration temperature above 30° C., separating the aqueous solution of sulfuric acid, stripping the aqueous solution by means of steam of the alcohol and ether that are in solution and at the same time avoiding any dilution or concentration of the sulfuric acid so that it is of constant concentration and recontacting the residual aqueous solution of sulfuric acid of 1 to 84% concentration with another portion of the olefin to further manufacture more of the alcohol.

FRANCIS M. ARCHIBALD.
HELMUTH G. SCHNEIDER.